United States Patent
Mori (12)

(10) Patent No.: US 9,156,417 B2
(45) Date of Patent: Oct. 13, 2015

(54) STRUCTURE FOR FRONT PART OF VEHICLE BODY

(75) Inventor: Takeo Mori, Susono (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/395,199

(22) PCT Filed: Apr. 19, 2012

(86) PCT No.: PCT/JP2012/060603
§ 371 (c)(1),
(2), (4) Date: Oct. 17, 2014

(87) PCT Pub. No.: WO2013/157122
PCT Pub. Date: Oct. 24, 2013

(65) Prior Publication Data
US 2015/0076847 A1     Mar. 19, 2015

(51) Int. Cl.
| B60R 19/34 | (2006.01) |
| B60R 19/18 | (2006.01) |
| B62D 21/15 | (2006.01) |
| B62D 25/08 | (2006.01) |
| B60R 19/24 | (2006.01) |

(52) U.S. Cl.
CPC .......... *B60R 19/18* (2013.01); *B60R 19/24* (2013.01); *B60R 19/34* (2013.01); *B62D 21/152* (2013.01); *B62D 25/082* (2013.01); *B60R 2019/186* (2013.01)

(58) Field of Classification Search
CPC ........ B60R 19/18; B60R 19/34; B60R 19/24; B60R 2019/186; B62D 25/082; B62D 21/152
USPC ............... 296/122, 132, 155, 120, 187.09
See application file for complete search history.

(56) References Cited

U.S. PATENT DOCUMENTS

| 5,727,826 A | 3/1998 | Frank et al. |
| 2004/0195862 A1 | 10/2004 | Saeki |
| 2014/0367982 A1* | 12/2014 | Kano et al. ............... 293/121 |

FOREIGN PATENT DOCUMENTS

| JP | S49-012525 A | 2/1974 |
| JP | S49-21833 A | 2/1974 |
| JP | H08-216806 A | 8/1996 |
| JP | 2000-052898 A | 2/2000 |
| JP | 2003-127895 A | 5/2003 |
| JP | 2003-182629 A | 7/2003 |
| JP | 2004-066932 A | 3/2004 |
| JP | 2004-189008 A | 7/2004 |
| JP | 2005-119537 A | 5/2005 |
| JP | 2008-213739 A | 9/2008 |

* cited by examiner

*Primary Examiner* — Pinel Romain
(74) *Attorney, Agent, or Firm* — Kenyon & Kenyon LLP

(57) ABSTRACT

Disclosed is a structure for a front part of a vehicle body including a front sidemember that extends in a longitudinal direction of a vehicle; a bumper reinforcement, at least a part of which is positioned at the same height as the front sidemember in a vertical direction of the vehicle, and extends in a lateral direction of the vehicle so as to face the front sidemember; and a support portion. The end portion of the bumper reinforcement has an extension portion that extends in the lateral direction of the vehicle up to a position which overlaps a wheel when seen from the longitudinal direction of the vehicle. At least a front surface of the bumper reinforcement in the longitudinal direction of the vehicle and the extension portion have strength higher than that of other portions of the bumper reinforcement.

8 Claims, 9 Drawing Sheets

(a)

(b)

(a)

(b)

(c)

(a)

(b)

(a)

(b)

(a)

(b)

STRUCTURE FOR FRONT PART OF VEHICLE BODY

CROSS-REFERENCE TO RELATED APPLICATIONS

This is a national phase application based on the PCT International Patent Application No. PCT/JP2012/060603 filed Apr. 19, 2012, the entire contents of which are incorporated herein by reference.

TECHNICAL FIELD

The present invention relates to a structure for a front part of a vehicle body of a vehicle.

BACKGROUND ART

In the related art, a structure for a front part of a vehicle body of a vehicle includes a bumper reinforcement at a front end of a front sidemember. In the structure for the front part of the vehicle body, the bumper reinforcement is turnably connected to a front end portion of a sidemember via a turning motion connection point. The bumper reinforcement is provided with a receiving portion that has an inclined surface. When only an end portion of the front part of the vehicle body in a lateral direction of the vehicle collides with a colliding object, the receiving portion serves to interfere with the colliding object, and slide toward a side portion of the vehicle.

CITATION LIST

Patent Literature

[Patent Literature 1] Japanese Unexamined Patent Application Publication No. 2003-127895

SUMMARY OF INVENTION

Technical Problem

In the structure for the front part of the vehicle body, a crush box may be disposed between the front end of the front sidemember and the bumper reinforcement so as to improve the collision performance of the front part of the vehicle body, and there is a problem in that when the structure is configured so as to correspond to even a minor lap collision as described above, the number of components and the weight of the vehicle body increase. Accordingly, various countermeasures are considered so as to improve collision performance in various forms of frontal collisions of the vehicle body without increasing the number of components and the weight of the vehicle body.

The present invention is made to solve the problems, and an object of the present invention is to provide a structure for a front part of a vehicle body that can improve collision performance.

Solution to Problem

A structure for a front part of a vehicle body includes a front sidemember that extends in a longitudinal direction of a vehicle; a bumper reinforcement, at least a part of which is positioned at the same height as the front sidemember in a vertical direction of the vehicle, and extends in a lateral direction of the vehicle so as to face the front sidemember, and a support portion through which the front sidemember supports an end portion of the bumper reinforcement in the lateral direction of the vehicle when the bumper reinforcement is deformed due to an external force. The end portion of the bumper reinforcement has an extension portion that extends in the lateral direction of the vehicle up to a position which overlaps a wheel when seen from the longitudinal direction of the vehicle. At least a front surface of the bumper reinforcement in the longitudinal direction of the vehicle and the extension portion have strength higher than that of other portions of the bumper reinforcement.

In this structure for the front part of the vehicle body, the front surface of the bumper reinforcement in the longitudinal direction of the vehicle has strength higher than that of the other portions of the bumper reinforcement. Accordingly, a portion between the high-strength portion of the front surface and the front sidemember functions as an impact absorbing portion. Accordingly, a crush box can be formed integrally with the bumper reinforcement. With the simple configuration in which the high-strength extension portion collides with the wheel, thereby transmitting load, it is possible to improve collision performance. When the end portion of the bumper reinforcement is deformed due to an external force, the front sidemember can support the end portion through the support portion. Accordingly, it is possible to cope with even a collision in which the end portion of the bumper reinforcement is deformed. As such, it is possible to cope with various forms of frontal vehicle body collisions and further improve collision performance without increasing the number of components and the weight of a vehicle body.

In the structure for the front part of the vehicle body, the support portion may be provided integrally with the bumper reinforcement. Accordingly, it is possible to prevent an increase in the number of components.

In the structure for the front part of the vehicle body, the support portion may have strength higher than that of other portions of the bumper reinforcement. As such, the high-strength support portion of the bumper reinforcement can satisfactorily transmit load to the front sidemember.

In the structure for the front part of the vehicle body, the support portion may be a member that is provided branching off from a side portion of the front sidemember. Accordingly, the member can satisfactorily transmit load to the front sidemember.

In the structure for the front part of the vehicle body, the support portion may be formed by a member that is bent outward from the front sidemember in the lateral direction of the vehicle. Accordingly, the member can satisfactorily transmit load to the front sidemember.

In the structure for the front part of the vehicle body, the bumper reinforcement may have a curved shape in which the end portion retreats rearward in the longitudinal direction of the vehicle. As such, since it is possible to bend bumper reinforcement toward the rear of the vehicle, it is possible to reduce influence on the design, and secure the degree of freedom in designing the bumper reinforcement.

In the structure for the front part of the vehicle body, the bumper reinforcement may have an impact absorbing portion that is positioned so as to face the front sidemember extending in the longitudinal direction of the vehicle. Accordingly, the structure for the front part of the vehicle body can efficiently absorb impact.

In the structure for the front part of the vehicle body, the bumper reinforcement may have an impact absorbing portion that is positioned so as to face the support portion. Accordingly, when the support portion supports the end portion of the bumper reinforcement in the lateral direction of the vehicle, the impact absorbing portion can absorb impact, and thus the support portion can reliably support the end portion.

A structure for a front part of a vehicle body includes a front sidemember that extends in a longitudinal direction of a vehicle; and a bumper reinforcement, at least a part of which is positioned at the same height as the front sidemember in a vertical direction of the vehicle, and extends in a lateral direction of the vehicle so as to face the front sidemember. An end portion of the bumper reinforcement in the lateral direction of the vehicle has an extension portion that extends in the lateral direction of the vehicle up to a position which overlaps a wheel when seen from the longitudinal direction of the vehicle. The extension portion of the bumper reinforcement is displaced while being turned, brought into contact with the wheel, and displaces the wheel in order for a vehicle body to separate away from the colliding body when the bumper reinforcement collides with a colliding body in the end portion side.

With this structure for the front part of the vehicle body, owing to the turning displacement of the extension portion of the bumper reinforcement, the colliding body is diverted to separate away from the host vehicle body, and in contrast, owing to the displacement of the wheel associated with the turning displacement, the host vehicle body can be steered to separate away from the colliding body. Accordingly, it is possible to improve collision performance.

Advantageous Effects of Invention

According to the present invention, it is possible to cope with various forms of frontal vehicle body collisions and further improve collision performance without increasing the number of components and the weight of a vehicle body.

DESCRIPTION OF EMBODIMENTS

Hereinafter, preferred embodiments of a structure for a front part of a vehicle body according to the present invention will be described with reference to the accompanying drawings. In each of the drawings, the same reference signs are assigned to the same or equivalent elements, and the repeated descriptions will not be given.

First Embodiment

Figure 1:
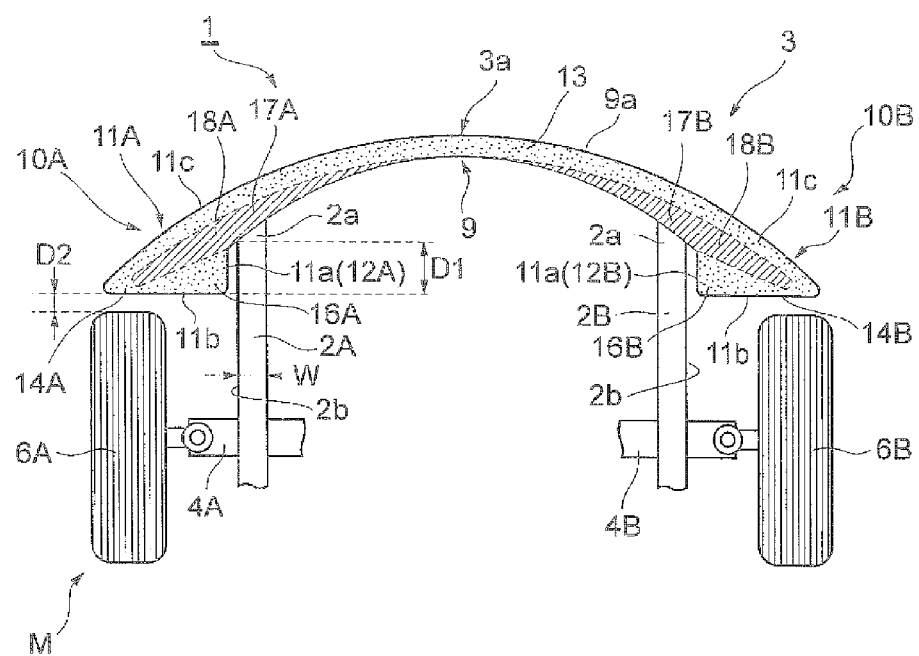
FIG. 1 is a plan view illustrating a structure for a front part of a vehicle body according to a first embodiment.

FIG. 1 is a plan view illustrating a structure 1 for the front part of the vehicle body according to a first embodiment. The structure 1 for the front part of the vehicle body includes a pair of front sidemembers 2A and 2B that extend in a longitudinal direction of a vehicle, and a bumper reinforcement 3 that extends in front of the front sidemembers 2A and 2B in a lateral direction of the vehicle. The front sidemembers 2A and 2B are apart from each other in the lateral direction of the vehicle, and extend in parallel with each other. Wheels 6A and 6B are respectively provided on outer sides of the front sidemembers 2A and 2B via suspension arms 4A and 4B in the lateral direction of the vehicle.

The bumper reinforcement 3 extends in the lateral direction of the vehicle while facing a front end portion 2a of each of the front sidemembers 2A and 2B, and is supported by the front end portions 2a. At least a part of the bumper reinforcement 3 is positioned at the same height as the front sidemembers 2A and 2B in a vertical direction of the vehicle. Opposite ends 10A and 10B of the bumper reinforcement 3 extend outward further than the front sidemembers 2A and 2B in the lateral direction of the vehicle, respectively. The entirety of the bumper reinforcement 3 has an arch shape. Specifically, the bumper reinforcement 3 is curved in such a manner that a front end 3a of the bumper reinforcement 3 protrudes forward furthest at a center position in the lateral direction of the vehicle, and the end portions 10A and 10B retreat rearward in the longitudinal direction of the vehicle.

The end portions 10A and 10B of the bumper reinforcement 3 have extension portions 11A and 11B, respectively. The extension portions 11A and 11B are respectively formed outward of the front sidemembers 2A and 2B in the lateral direction of the vehicle, and extend up to positions in the lateral direction of the vehicle, respectively, which overlap the wheels 6A and 6B when seen from the longitudinal direction of the vehicle. Insofar as the directional position of the wheels 6A and 6B is not specifically described, the wheels 6A and 6B are assumed to be directed straight forward (as illustrated in FIG. 1, a rotational axis line is orthogonal to the front sidemembers 2A and 2B). That is, the wheels 6A and 6B are not turned right or left.

Each of the extension portions 11A and 11B swells toward the rear of the vehicle in such a manner that each of the extension portions 11A and 11B has a width greater than that of the member of the base body portion 9 extending between the front sidemember 2A and the front sidemember 2B. Specifically, each of the extension portions 11A and 11B swells toward the rear of the vehicle, and has a facing surface 11a that faces an outer side surface 2b of the front sidemember 2A in the lateral direction of the vehicle while being parallel with the outer side surface 2b. Each of the facing surfaces 11a is disposed between the wheel 6A and the front sidemember 2A, and between the wheel 6B and the front sidemember 2B. The extension portions 11A and 11B have rear surfaces 11b that face the wheels 6A and 6B while being parallel with a rotational axis L, respectively. It is preferable that a distance D1 be set to be greater than at least a width W of the member of each of the front sidemembers 2A and 2B. The distance D1 is a distance between the front end portion 2a of each of the front sidemembers 2A and 2B and the rear surface 11b. It is preferable that a gap between the rear surface 11b and each of the wheels 6A and 6B have a distance D2 of 50 mm or less. A front surface 11c of each of the extension portions 11A and 11B is curved to form a curved surface that is continuous with a front surface 9a of the base body portion 9. The rear surface 11b connects an outer distal end of the front surface 9a in the lateral direction of the vehicle and a rear end of the facing surface 11a.

The structure 1 for the front part of the vehicle body includes support portions 12A and 12B. When the bumper reinforcement 3 is deformed due to an external force, the front sidemembers 2A and 2B support the end portions 10A and 10B of the bumper reinforcement 3 through the support portions 12A and 12B, respectively. In the embodiment, the support portions 12A and 12B are respectively provided integrally with the extension portions 11A and 11B of the bumper reinforcement 3. Specifically, the support portions 12A and 12B are formed by the facing surfaces 11a of the extension portions 11A and 11B, respectively, the facing surfaces 11a facing the front sidemembers 2A and 2B. When the bumper reinforcement 3 is deformed due to an external force, the support portions 12A and 12B are respectively brought into contact with the side surfaces 2b of the front sidemembers 2A and 2B, and thus are respectively received by the side surfaces 2b. Accordingly, the front sidemembers 2A and 2B can support the end portions 10A and 10B of the bumper reinforcement 3 through the support portions 12A and 12B, respectively.

At least the front surfaces 9a and 11c, and the extension portions 11A and 11b of the bumper reinforcement 3 are set to have strength higher than that of other portions of the bumper reinforcement 3. In the embodiment, the support portions 12A and 12B are set to have strength higher than that of other portions of the bumper reinforcement 3. The portions set to have high strength, for example, the front surfaces 9a and 11c, the extension portions 11A and 11B, the support portions 12A and 12B, and the like, are made of a high-strength material, and thereby the buckling strength thereof is set to be high. The other portions are made of a low-strength material, and thereby the buckling strength thereof is set to be low. The high-strength material is made via a quenching treatment. The low-strength material is formed by not quenching a material, or via an annealing treatment. In FIG. 1, a dotted portion is the high-strength portion, and a hatched portion is the low-strength portion.

Specifically, in the bumper reinforcement 3, a front high-strength portion 13 is formed by the front surface 9a of the base body portion 9, an edge portion that is formed along the front surface 9a, the front surfaces 11c of the extension portions 11A and 11B, and edge portions that are formed along the front surfaces 11c. A rear high-strength portion 14A is formed by the rear surface 11b of the extension portion 11A and an edge portion that is formed along the rear surface 11b. A rear high-strength portion 14B is formed by the rear surface 11b of the extension portion 11B and an edge portion that is formed along the rear surface 11b. A support portion high-strength portion 16A is formed by the facing surface 11a of the extension portion 11A and an edge portion that is formed along the facing surface 11a, that is, the support portion high-strength portion 16A is formed by the support portion 12A. A support portion high-strength portion 16B is formed by the facing surface 11a of the extension portion 11B and an edge portion that is formed along the facing surface 11a, that is, the support portion high-strength portion 16B is formed by the support portion 12B.

Base body low-strength portions 17A and 17B are formed in the bumper reinforcement 3 in the lateral direction of the vehicle so as to be positioned rearward of the front high-strength portion 13 of the base body portion 9. It is preferable that the base body low-strength portions 17A and 17B be formed in the bumper reinforcement 3 so as to be positioned forward of the front end portions 2a of the front sidemember 2. An extension portion low-strength portion 18A is formed in a region of the extension portion 11A, which is interposed between the front high-strength portion 13, the rear high-strength portion 14A, and the support portion high-strength portion 16A. An extension portion low-strength portion 18B is formed in a region of the extension portion 11B, which is interposed between the front high-strength portion 13, the rear high-strength portion 14B, and the support portion high-strength portion 16B.

Subsequently, the action and effects of the structure 1 for the front part of the vehicle body according to the first embodiment will be described.

Figure 9:
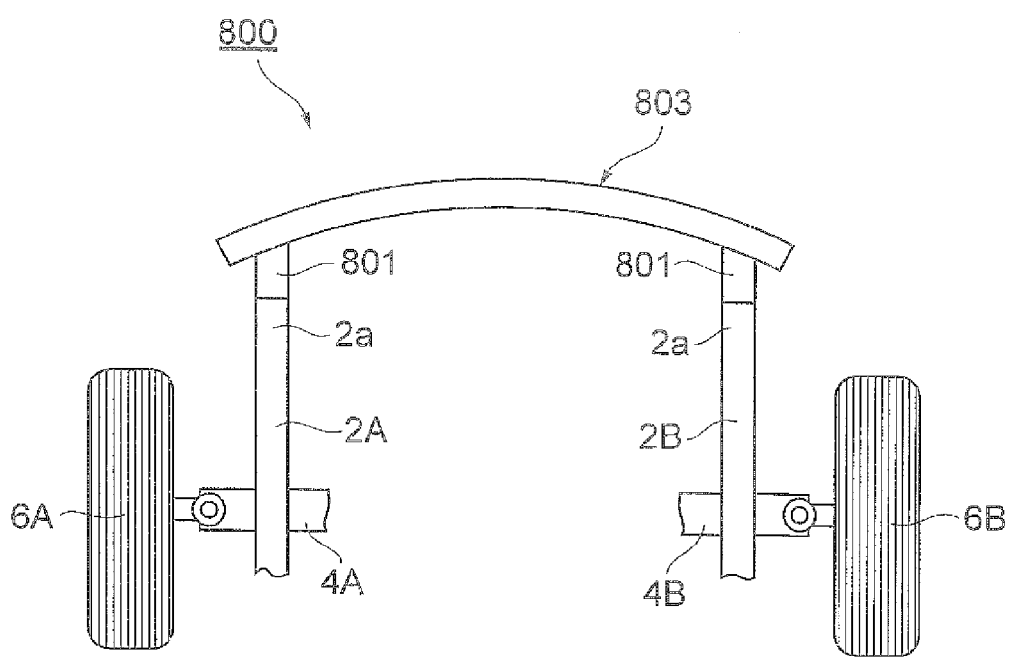
FIG. 9 is a plan view illustrating the configuration of a structure for a front part of a vehicle body according to a comparative example.

FIG. 9 is a plan view illustrating a structure 800 for a front part of a vehicle body according to a comparative example. In the structure 800 for the front part of the vehicle body according to the comparative example, the bumper reinforcement 803 does not have the extension portions that overlap the wheels when seen from the longitudinal direction of the vehicle. Each of crush boxes 801 is provided between the bumper reinforcement 803 and the front end portion 2a of the front sidemember 2A, and between the bumper reinforcement 803 and the front end portion 2a of the front sidemember 2B. In the structure 800 for the front part of the vehicle body, the crush boxes 801 are required to be provided separately from the bumper reinforcement 803, thereby increasing the number of components, and the weight of the vehicle body. When a colliding body collides with a host vehicle at an offset position in the lateral direction of the vehicle, the structure 800 for the front part of the vehicle body cannot receive a significant load.

Figure 2:
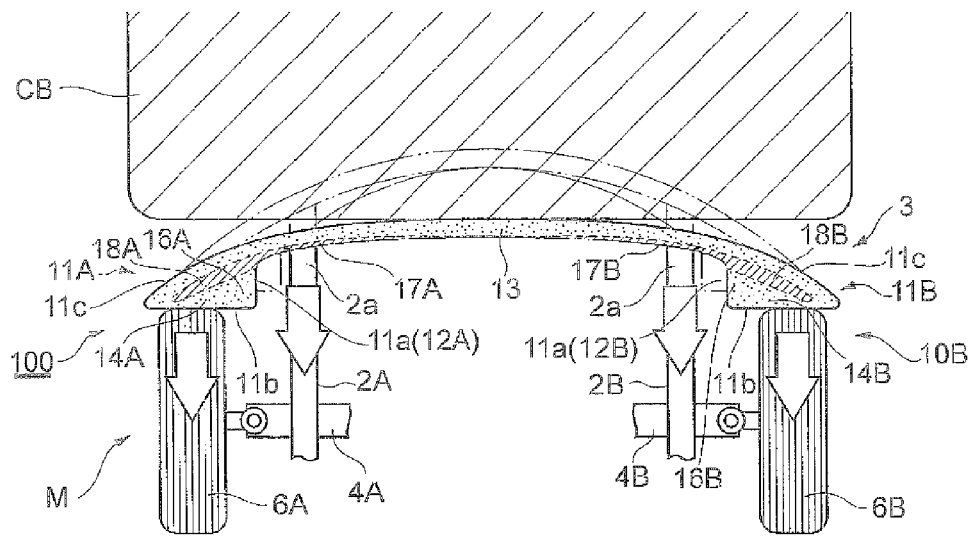
FIGS. 2(a) and 2(b) are plan views illustrating when a host vehicle body collides with a colliding body.
Figure 2:
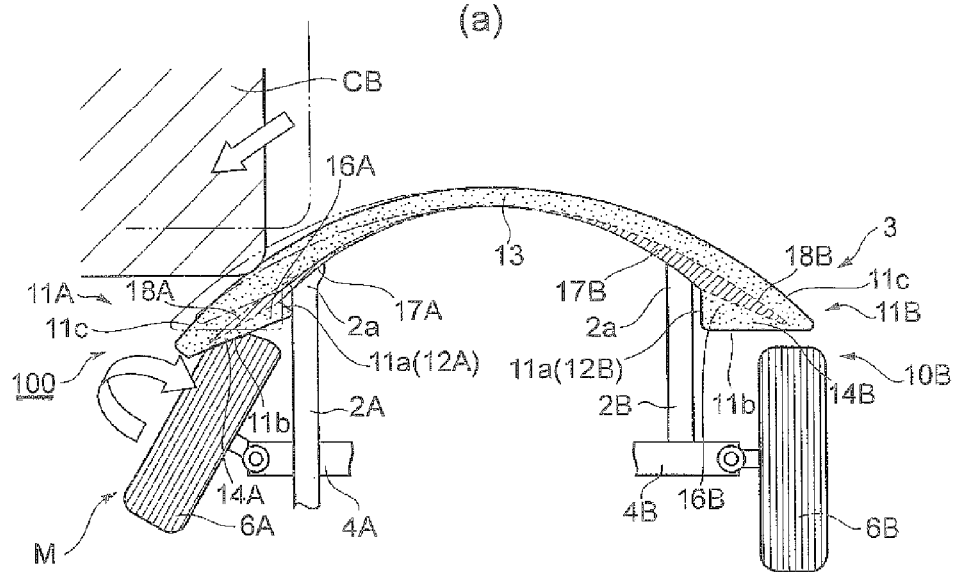

In contrast, in the structure 1 for the front part of the vehicle body, the front high-strength portion 13 is formed by the front surfaces 9a and 11c of the bumper reinforcement 3 in the longitudinal direction of the vehicle. Accordingly, as illustrated in FIG. 2(a), the base body low-strength portion 17A functions as an impact absorbing portion between the front high-strength portion 13 of the front surfaces 9a and 11c and the respective front sidemembers 2A, and the base body low-strength portion 17B functions as an impact absorbing portion between the front high-strength portion 13 of the front surfaces 9a and 11c and the front sidemember 2B. Accordingly, the crush box can be formed integrally with the bumper reinforcement.

In the structure 1 for the front part of the vehicle body, the extension portions 11A and 11B are provided to extend up to the positions that overlap the wheels 6A and 6B, respectively. The extension portion 11A has the front high-strength portion 13 formed along the front surface 11c and the rear high-strength portion 14A formed along the rear surface 11b, and the extension portion 11B has the front high-strength portion 13 formed along the front surface 11c and the rear high-strength portion 14A formed along the rear surface 11b, and thereby the strength of the extension portions 11A and 11B is set to be high. Accordingly, as illustrated FIG. 2(a), the extension portions 11A and 11B collide with the wheels 6A and 6B, respectively, and load is transmitted to the wheels 6A and 6B via the extension portions 11A and 11B, respectively, and thereby a load transmission path can be formed via each of the wheels 6A and 6B in addition to a load transmission path of each of the front sidemembers 2A and 2B. The extension portions 11A and 11B have the extension portion low-strength portions 18A and 18B, respectively. Accordingly, during a collision, the collapse of the extension portion low-strength portions 18A and 18B allows the bumper reinforcement 3 to absorb impact. The above-mentioned simple configuration can improve collision performance.

As illustrated in FIG. 2(b), when a host vehicle body M collides with a colliding body CB at an offset position, load is input to only the end portions 10A. In the offset collision, the colliding body CB collides with the end portion 10A of the bumper reinforcement 3, and collides with the vicinity of the front sidemember 2A or a part of the bumper reinforcement 3 outward of the front sidemember 2A in the lateral direction of the vehicle. When the end portion 10A of the bumper reinforcement 3 is deformed due to an external force during the offset collision, the front sidemember 2A can support the end portion 10A through the support portion 12A. Accordingly, it is possible to cope with even a collision that causes the deformation of the end portion 10A of the bumper reinforcement 3. As such, it is possible to cope with various forms of frontal vehicle body collisions without increasing the number of components and the weight of the vehicle body, and further improve collision performance. When the end portion 10B is deformed, the support portion 12B also provides the same effects.

In the structure for the front part of the vehicle body, the support portions 12A and 12B are provided integrally with the bumper reinforcement. Accordingly, it is possible to prevent an increase in the number of components.

In the structure 1 for the front part of the vehicle body, the support portion high-strength portions 16A and 16B are respectively formed along the support portions 12A and 12B. As such, the high-strength support portions 12A and 12B of the bumper reinforcement 3 can satisfactorily transmit load to the front sidemembers 2A and 2B.

In the structure 1 for the front part of the vehicle body, the bumper reinforcement 3 has a curved shape in which the end portions 10A and 10B retreat rearward in the longitudinal direction of the vehicle. As such, since it is possible to bend bumper reinforcement 3 toward the rear of the vehicle, it is possible to reduce influence on the design, and secure the degree of freedom in designing the bumper reinforcement 3.

In the structure 1 for the front part of the vehicle body, when the bumper reinforcement 3 collides with the colliding body CB at an offset position, and load is input to any one of the end portions 10A and 10B, the extension portion 11A or 11B of the bumper reinforcement 3 is displaced while being turned, brought into contact with the wheel 6A or 6B, and displaces the wheel in order for the vehicle body M to separate away from the colliding body CB. For example, as illustrated in FIG. 2(b), when the colliding body CB collides with the vicinity of the front sidemember 2A or the end portion 10A of the bumper reinforcement 3, which is positioned outward of the front sidemember 2A in the lateral direction of the vehicle, the extension portion 11A is displaced while being turned about the front end portion 2a of the front sidemember 2A. Accordingly, the rear surface 11b of the extension portion 11A is brought into contact with the wheel 6A, and turns the wheel 6A toward a turning direction R. Accordingly, the vehicle body M is steered so as to separate away from the colliding body CB. The extension portion 11A is displaced while being turned, and thus the front surface 11c of the extension portion 11A inclines outward and rearward in the lateral direction of the vehicle. The inclined front surface 11c causes the colliding body CB to drift to the opposite to the vehicle body M. As such, owing to the turning displacement of the extension portion 11A of the bumper reinforcement 3, the colliding body CB is diverted to separate away from the host vehicle body M, and in contrast, owing to the displacement of the wheel 6A associated with the turning displacement, the host vehicle body M can be steered to separate away from the colliding body. Accordingly, it is possible to improve collision performance.

Second Embodiment

Figure 3:
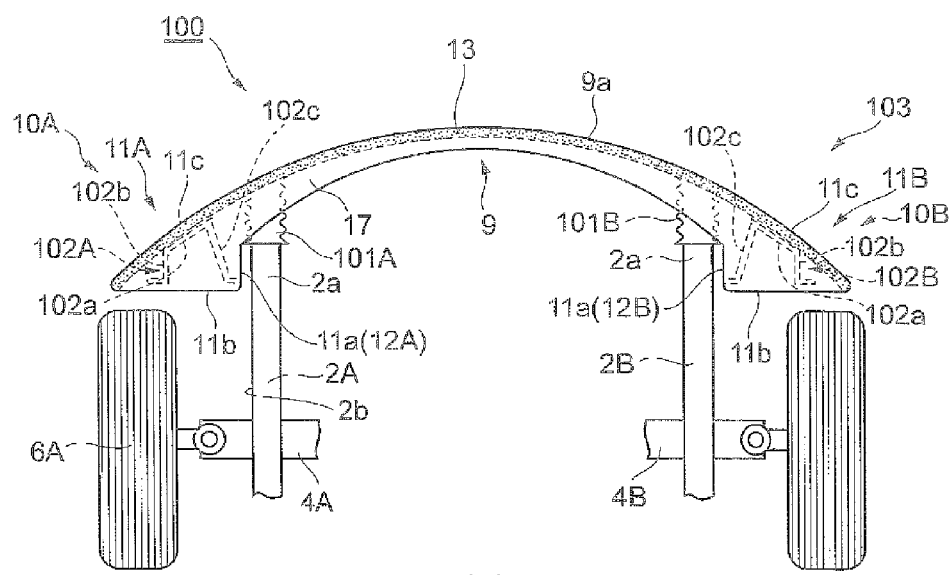
FIG. 3(a) is a plan view illustrating the configuration of a structure for a front part of a vehicle body according to a second embodiment.
FIG. 3(b) is a perspective view of a crush box.
FIG. 3(c) is a perspective view of a bulkhead.
Figure 3:
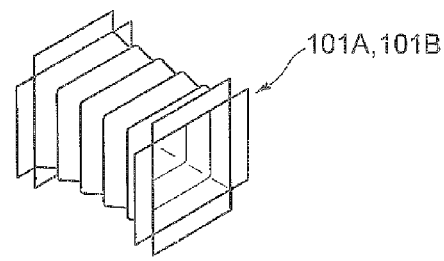
Figure 3:
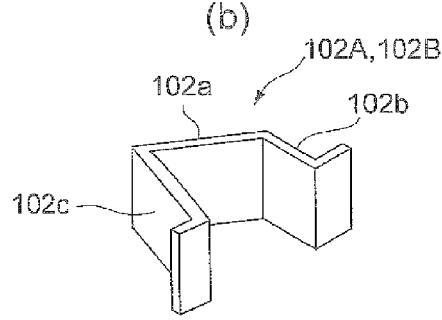

FIG. 3(a) is a plan view illustrating the configuration of a structure 100 for a front part of a vehicle body according to a second embodiment. The structure 100 for the front part of the vehicle body is different from the structure 100 for the front part of the vehicle body of the first embodiment mainly in that a bumper reinforcement 103 has crush boxes 101A and 101B, and bulkheads 102A and 102B. The bumper reinforcement 103 of the second embodiment has the same exterior shape as the bumper reinforcement 3 of the first embodiment.

In FIG. 3(a), in the bumper reinforcement 103, a dotted portion is the high-strength portion, and a non-dotted portion is the low-strength portion. Specifically, in the bumper reinforcement 103, the front high-strength portion 13 is formed by the front surface 9a of the base body portion 9 and an edge portion that is formed along the front surface 9a, and the front surface 11c of the extension portions 11A and 11B and edge portions that are formed along the front surface 11c. A low-strength portion 17 is formed by the entirety of portions that are positioned rearward of the front high-strength portion 13 in the base body portion 9 and the extension portions 11A and 11B of the bumper reinforcement 103.

The crush boxes 101A and 101B are respectively disposed in the front end portions 2a of the front sidemembers 2A and 2B. The crush boxes 101A and 101B are disposed inside the bumper reinforcement 103. As illustrated in FIG. 3(b), each side surface of each of the crush boxes 101A and 101B has a bellows shape, thereby improving the impact absorbing performance of the crush boxes 101A and 101B. As such, the disposition of the crush boxes 101A and 101B improves the frontal impact absorbing performance of the front sidemembers 2A and 2B.

Since the bulkheads 102A and 102B are respectively disposed inside the extension portions 11A and 11B, the strength of the extension portions 11A and 11B is secured. As illustrated in FIGS. 3(a) and 3(c), each of the bulkheads 102A and 102B includes a front wall portion 102a that extends along the front surface 11c of each of the extension portions 11A and 11B; a side wall portion 102b that extends from the front surface 11c to the rear surface 11b; and a side wall portion 102c that extends from the front surface 11c to an angled portion between the rear surface 11b and the facing surface 11a. It is preferable that the bulkheads 102A and 102B be made of a material having strength higher than that of the crush boxes 101A and 101B. For example, the bulkheads 102A and 102B are made of an ultra high-tension steel material, and the crush boxes 101A and 101B are made of a low-strength steel material. The extension portions 11A and 11B have strength higher than that of other portions (for example, the region of the low-strength portion 17 of the base body portion 9) owing to the bulkheads 102A and 102B. Each of the side wall portions 102b and 102c supports the rear surface 11b, thereby increasing the strength of the vicinity of the rear surface 11b. The side wall portion 102c supports the angled portion between the rear surface 11b and the facing surface 11a, thereby increasing the strength of the vicinity of the facing surface 11a, that is, the strength of the support portions 12A and 12B.

Third Embodiment

Figure 4:
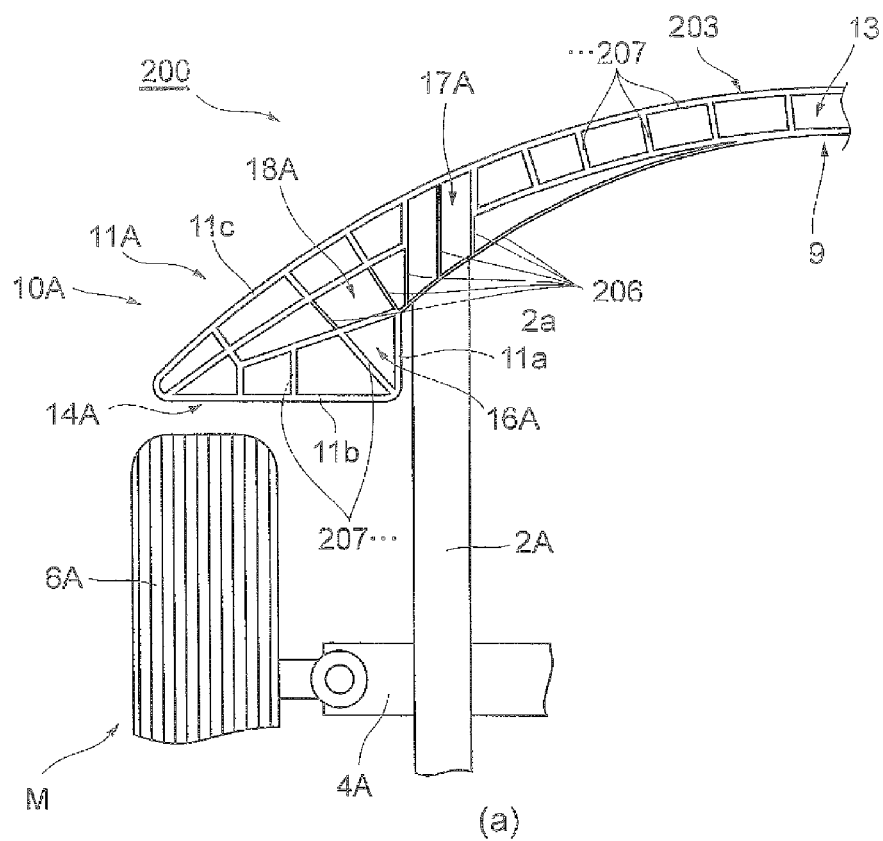
FIG. 4(a) is a plan view illustrating the configuration of a structure for a front part of a vehicle body according to a third embodiment.
FIG. 4(b) is a perspective view of a bumper reinforcement in the structure for the front part of the vehicle body according to the third embodiment.
Figure 4:
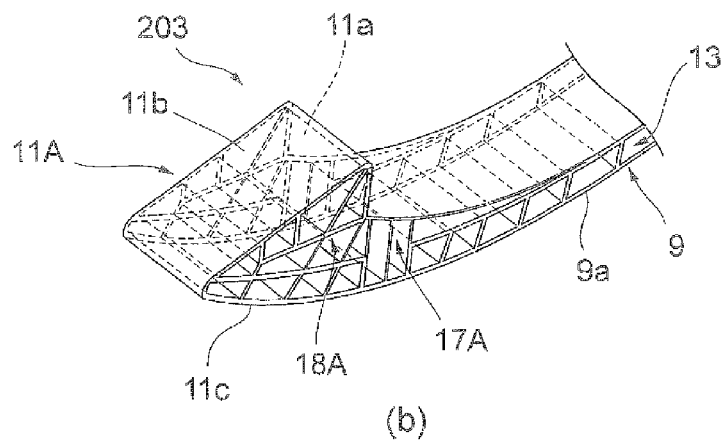

FIG. 4(a) is a plan view illustrating the configuration of a structure 200 for a front part of a vehicle body according to a third embodiment. FIG. 4(b) is a perspective view of a bumper reinforcement 203 of the structure 200 for the front part of the vehicle body according to the third embodiment. FIGS. 4(a) and 4(b) illustrate the configuration of only the end portion 10A of the bumper reinforcement 203, and the end portion 10B also has the same configuration. The structure 200 for the front part of the vehicle body is different from the structure 1 for the front part of the vehicle body of the first embodiment mainly in that the bumper reinforcement 203 is molded by a die casting method. The strength of each portion of the bumper reinforcement 203 is adjusted by adjusting the thickness of each rib. The bumper reinforcement 203 of the third embodiment has the same exterior shape as the bumper reinforcement 3 of the first embodiment. Specifically, ribs 207 are thicker than ribs 206. In the bumper reinforcement 203, the ribs 207 form the front high-strength portion 13, the rear high-strength portions 14A and 14B, and the support portion high-strength portions 16A and 16B, and the ribs 206 form the base body low-strength portions 17A and 17B and the extension portion low-strength portions 18A and 18B.

Fourth Embodiment

Figure 5:
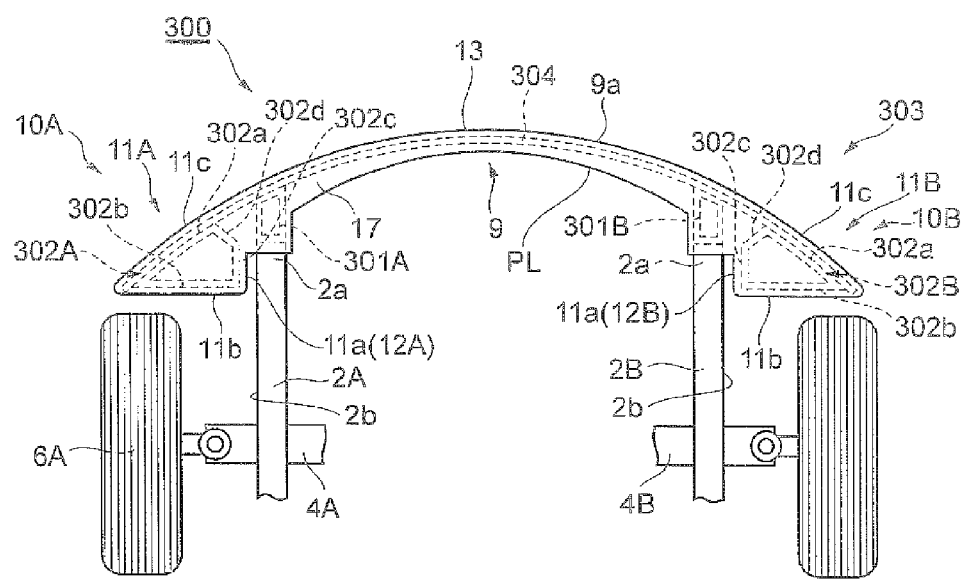
FIG. 5 is a plan view illustrating the configuration of a structure for a front part of a vehicle body according to a fourth embodiment.

FIG. 5 is a plan view illustrating the configuration of a structure 300 for a front part of a vehicle body according to a fourth embodiment. The structure 300 for the front part of the vehicle body is different from the structure 1 of the front part of the vehicle body of the first embodiment mainly in that resin is integrally molded so as to envelop steel members in the bumper reinforcement 303. Specifically, the bumper reinforcement 303 has crush boxes 301A and 301B that are respectively disposed in front of the front end portions 2a of the front sidemembers 2A and 2B. The crush boxes 301A and 301B are made of a low-strength steel material. The crush boxes 301A and 301B are disposed inside the bumper reinforcement 303. As such, the disposition of the crush boxes 301A and 301B improves the frontal impact absorbing performance of the front sidemembers 2A and 2B.

The bumper reinforcement 303 has an arch-shaped long member 304 that extends along the front surfaces 9a and 11c. The long member 304 is made of an ultra high-tension steel material. Accordingly, the front surfaces 9a and 11c have strength higher than that of other portions (for example, the low-strength portion 17, in which the steel members are not disposed and are made of only resin) of the bumper reinforcement 303.

The bumper reinforcement 303 has side boxes 302A and 302B that are respectively disposed in the extension portions 11A and 11B. The side boxes 302A and 302B are made of an ultra high-tension steel material. Accordingly, the extension portions 11A and 11B have strength higher than that of other portions (for example, the low-strength portion 17, in which the steel members are not disposed and are made of only resin) of the bumper reinforcement 303. Each of the side boxes 302A and 302B includes a front wall portion 302a that extends along the front surface 11c of each of the extension portions 11A and 11B; a rear wall portion 302b that extends along the rear surface 11b; a side wall portion 302c that extends along the facing surface 11a; and a side wall portion 302d that extends from the side wall portion 302c to the front wall portion 302a. The rear wall portion 302b supports the rear surface 11b, thereby increasing the strength of the vicinity of the rear surface 11b. The side wall portion 302c supports the facing surface 11a, thereby increasing the strength of the vicinity of the facing surface 11a, that is, the strength of the support portions 12A and 12B.

In the configuration of the bumper reinforcement 303, resin PL is integrally molded so as to envelop the entirety of the crush boxes 301A and 301B, the side boxes 302A and 302B, and the long member 304. Since the steel members are integrally molded in the resin, it is possible to reduce the weight of the bumper reinforcement 303.

Fifth Embodiment

Figure 6:
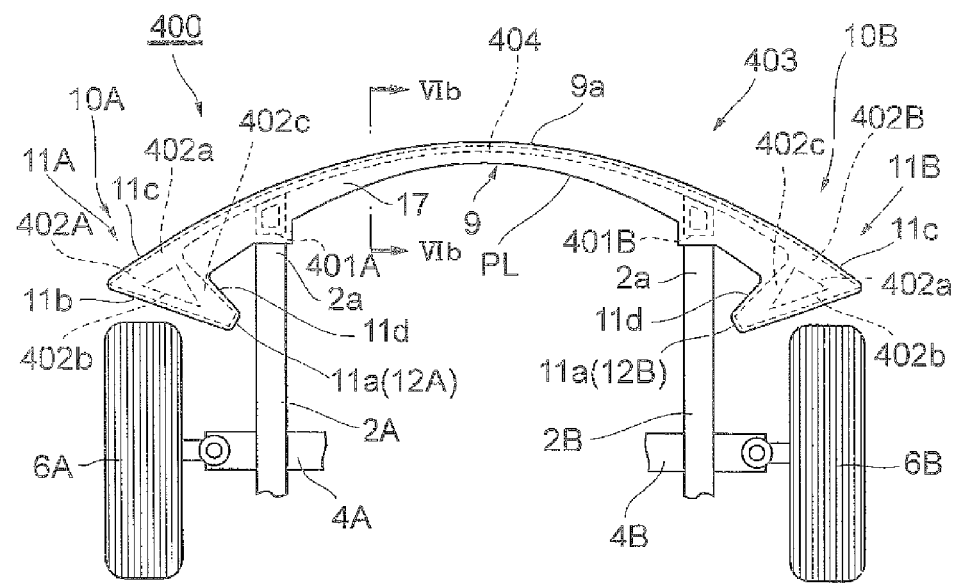
FIG. 6 is a plan view illustrating the configuration of a structure for a front part of a vehicle body according to a fifth embodiment.
Figure 6:
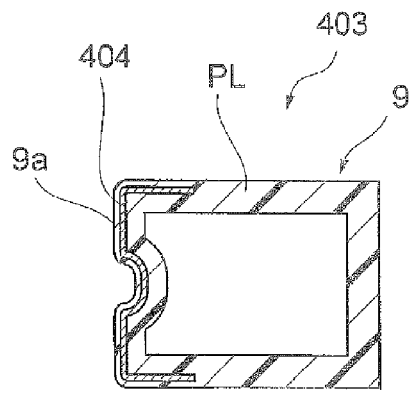

FIG. 6 is a plan view illustrating the configuration of a structure 400 for a front part of a vehicle body according to a fifth embodiment. In the structure 400 for the front part of the vehicle body, a bumper reinforcement 403 and steel members have shapes different from those in the structure 300 for the front part of the vehicle body according to the fourth embodiment.

The bumper reinforcement 403 has crush boxes 401A and 401B that are respectively disposed in front of the front end portions 2a of the front sidemembers 2A and 2B. The crush boxes 401A and 401B are made of a low-strength steel material. The crush boxes 401A and 401B are disposed inside the bumper reinforcement 403. The disposition of the crush boxes 401A and 401B improves the frontal impact absorbing performance of the front sidemembers 2A and 2B.

The bumper reinforcement 403 has an arch-shaped long member 404 that extends along the front surfaces 9a and 11c. The long member 404 has side box-shaped portions 402A and 402B that are respectively positioned to correspond to the extension portions 11A and 11B of the opposite end portions. In the third embodiment, the long member 304 is formed separate from the side boxes 302A and 302B, and in contrast, in the fourth embodiment, the long member 404 is formed integrally with the side box-shaped portions 402A and 402B. The long member 404 is made of an ultra high-tension steel material. Accordingly, the front surfaces 9a and 11c have strength higher than that of other portions (for example, the low-strength portion 17, in which the steel members are not disposed and are made of only resin) of the bumper reinforcement 403.

The side box-shaped portions 402A and 402B are respectively formed at the positions of the extension portions 11A and 11B at opposite ends of the long member 404, and have a triangular shape which inclines inward in the lateral direction of the vehicle. Each of the side box-shaped portions 402A and 402B includes an arch-shaped front wall portion 402a that is continuous with the arch-shaped long member 404 and extends in the lateral direction of the vehicle; a rear wall portion 402b that extends inward in the lateral direction of the vehicle from an outer end portion of the front wall portion 402a in the lateral direction of the vehicle; and a side wall portion 402c that extends from an inner end portion of the rear wall portion 402b in the lateral direction of the vehicle to an inner end portion of the front wall portion 402a in the lateral direction of the vehicle. The rear wall portion 402b inclines with respect to the rotational axis of the wheels 6A and 6B that are directed straight forward, and the rear wall portion 402b inclines from an outer side toward an inner side in the lateral direction of the vehicle so as to retreat rearward. The side wall portion 402c also inclines from the outer side toward the inner side in the lateral direction of the vehicle so as to retreat rearward.

As described above, the bumper reinforcement 403 is formed by integrating the long member 404 having the side box-shaped portions 402A and 402B with the crush boxes 401A and 401B via a resin molding process. In the bumper reinforcement 403, the shapes of the extension portions 11A and 11B are respectively aligned with the shapes of the side box-shaped portions 402A and 402B. That is, each of the extension portions 11A and 11B has the front surface 11c that is formed along the front wall portion 402a of each of the side box-shaped portions 402A and 402B; the rear surface 11b that is formed along the rear wall portion 402b; the facing surface 11a that is formed in a connection portion between the rear wall portion 402b and the side wall portion 402c; and a side surface 11d that is formed along the side wall portion 402c. The facing surfaces 11a of the front sidemembers 2A and 2B function as the support portions 12A and 12B, respectively. As such, since the steel members are integrally molded in the resin, it is possible to further reduce the weight of the bumper reinforcement 403.

Sixth Embodiment

Figure 7:
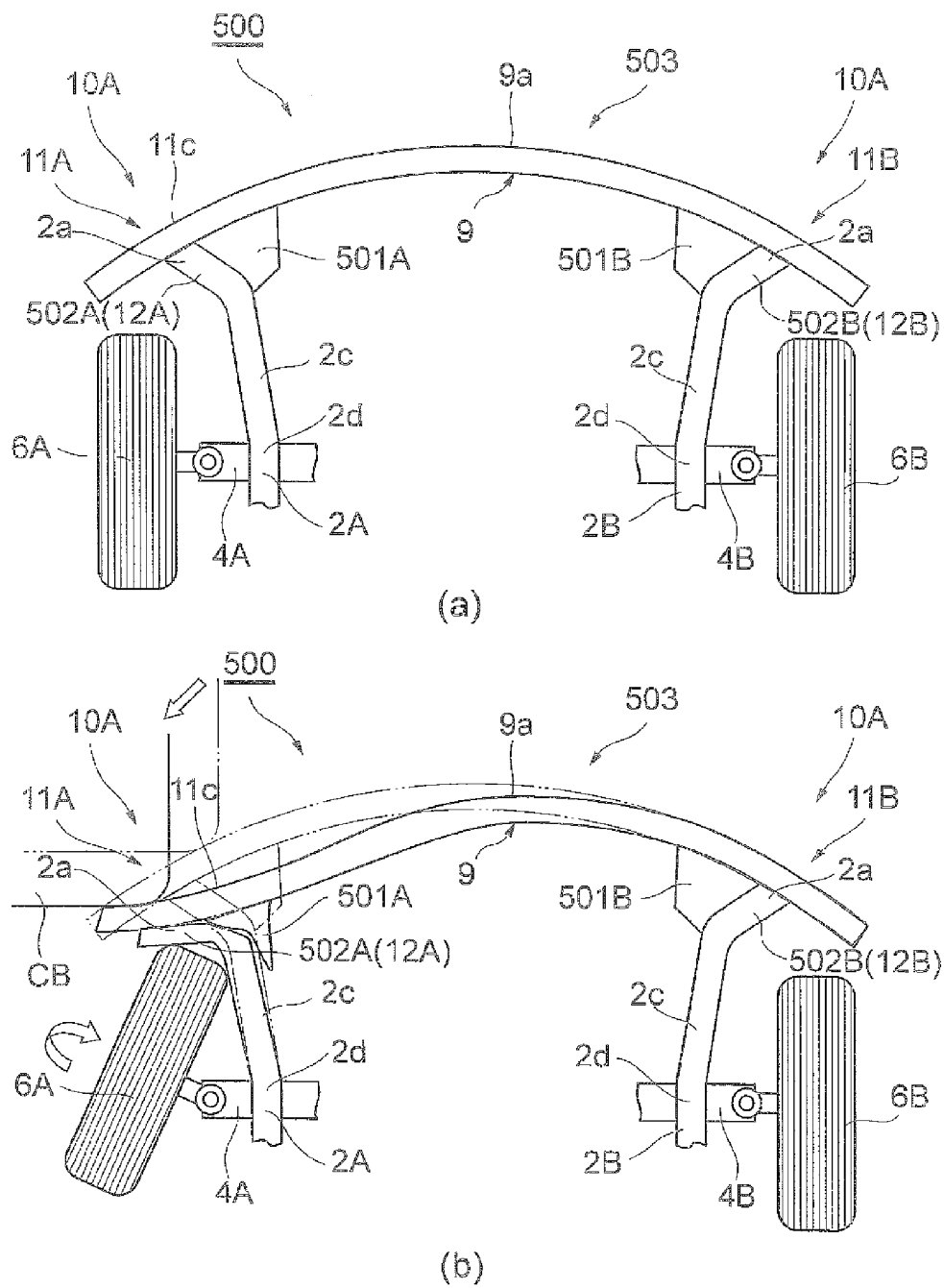
FIG. 7(a) is a plan view illustrating the configuration of a structure for a front part of a vehicle body according to a sixth embodiment.
FIG. 7(b) is a plan view illustrating when the structure for the front part of the vehicle body of the sixth embodiment collides with the colliding body.

FIG. 7(a) is a plan view illustrating the configuration of a structure 500 for a front part of a vehicle body according to a sixth embodiment. The structure 500 for the front part of the vehicle body is different from that of the first embodiment mainly in that the extension portions 11A and 11B of a bumper reinforcement 503 are respectively supported by bent portions 502A and 502B of the front sidemember 2.

The bumper reinforcement 503 has the extension portions 11A and 11B that extend up to the positions in the lateral direction of the vehicle, respectively, which overlap the wheels 6A and 6B when seen from the longitudinal direction of the vehicle. In contrast, the front sidemembers 2A and 2B have the bent portions 502A and 502B formed in the front end portions 2a, respectively, and the bent portions 502A and 502B are bent outward in the lateral direction of the vehicle. The front end portions 2a of the bent portions 502A and 502B are respectively connected to the extension portions 11A and 11B. When the end portions 10A and 10B of the bumper reinforcement 503 are deformed, the bent portions 502A and 502B of the front sidemembers 2A and 2B function as the support portions 12A and 12B that support the end portions 10A and 10B, respectively. Each of the front sidemembers 2A and 2B has a parallel portion 2d that extends straight in the longitudinal direction of the vehicle and is parallel with another parallel portion 2d, and an inclined portion 2c that gently inclines from the parallel portion 2d to each of the bent portions 502A and 502B. The inclination of the inclined portion 2c is gentler than that of the bent portions 502A and 502B. The front sidemembers 2A and 2B may be respectively formed by only the parallel portion 2d and the bent portion 502A and only the parallel portion 2d and the bent portion 502B without having the inclined portions 2c.

The bumper reinforcement 503 includes impact absorbing portions 501A and 501B are provided in parts thereof. The impact absorbing portions 501A and 501B have strength lower than that of the other portion (a portion that extends in the lateral direction of vehicle) of the bumper reinforcement 503. The impact absorbing portion 501A is disposed between the portion of the bumper reinforcement 503, which extends in the lateral direction of the vehicle, and an inner side of the bent portion 502A of the front sidemember 2A so as to face the front end portion 2a of the front sidemember 2A. The impact absorbing portion 501B is disposed between the portion of the bumper reinforcement 503, which extends in the lateral direction of the vehicle, and an inner side of the bent portion 502B of the front sidemember 2B so as to face the front end portion 2a of the front sidemember 2B. Each of the impact absorbing portions 501A and 501B is formed by the disposition of a rubber member.

In the structure 500 for the front part of the vehicle body, when the colliding body CB collides with a portion of the bumper reinforcement 503, which is positioned outward of the parallel portion 2d of any one of the front sidemembers 2A and 2B, the extension portion 11A or 11B of the bumper reinforcement 503 is displaced while being turned, brought into contact with the wheel 6A or 6B, and displaces the wheel 6A or 6B in order for the vehicle body M to separate away from the colliding body CB. For example, as illustrated in FIG. 7(b), when the colliding body CB collides with the end portion 10A of the bumper reinforcement 503, which is positioned outward of the parallel portion 2d of the front sidemember 2A in the lateral direction of the vehicle, the extension portion 11A is displaced while being turned. Accordingly, the extension portion 11A is brought into contact with the wheel 6A, and turns the wheel 6A toward the turning direction R. Accordingly, the vehicle body M is steered so as to separate away from the colliding body CB. The extension portion 11A is displaced while being turned, and thus the front surface 11c of the extension portion 11A inclines outward and rearward in the lateral direction of the vehicle. The inclined front surface 11c causes the colliding body CB to drift opposite to the vehicle body M. As such, owing to the turning displacement of the extension portion 11A of the bumper reinforcement 503, the colliding body CB is diverted to separate away from the host vehicle body M, and in contrast, owing to the displacement of the wheel 6A associated with the turning displacement, the host vehicle body M can be steered to separate away from the colliding body. Accordingly, it is possible to improve collision performance. The inclined portion 2c is formed to incline, but may be provided to extend straight in the longitudinal direction of the vehicle.

Seventh Embodiment

Figure 8:
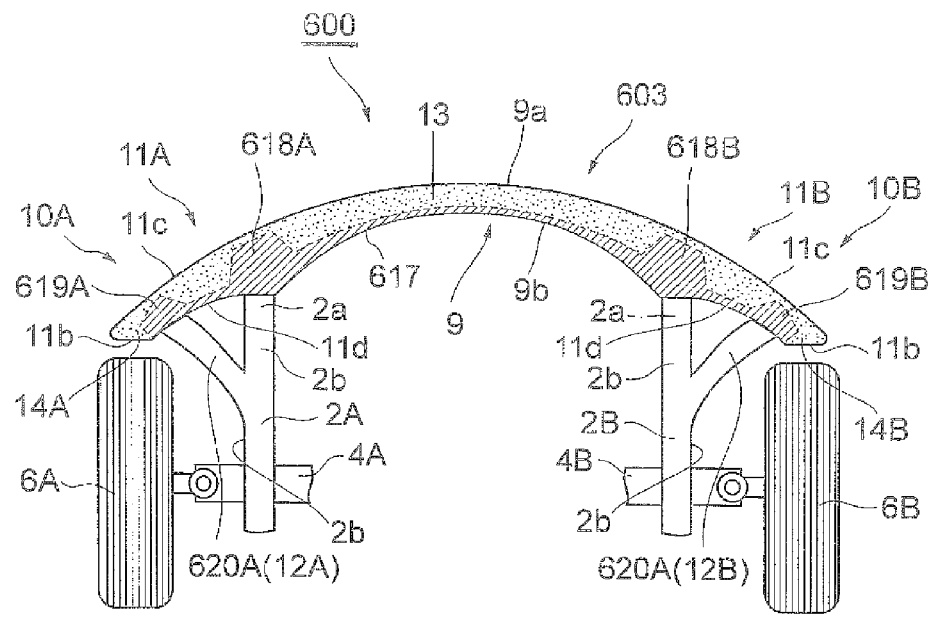
FIG. 8(a) is a plan view illustrating the configuration of a structure for a front part of a vehicle body according to a seventh embodiment.
FIG. 8(b) is a plan view illustrating the configuration of a structure for a front part of a vehicle body according to an eighth embodiment.
Figure 8:
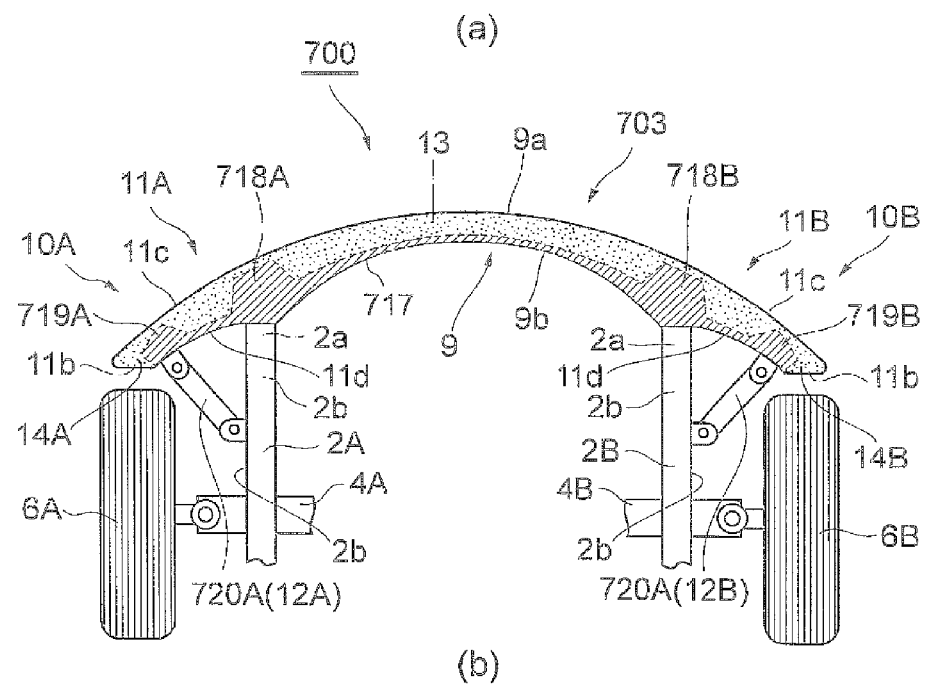

FIG. 8(a) is a plan view illustrating the configuration of a structure 600 for a front part of a vehicle body according to a seventh embodiment. The structure 600 for the front part of the vehicle body is different from that of the first embodiment mainly in that the extension portions 11A and 11B of a bumper reinforcement 603 are respectively supported by branch members 620A and 620B that branch off from the front sidemembers 2A and 2B.

The front sidemember 2A has the branch member 620A that branches off outward in the lateral direction of the vehicle at a middle position of the side surface 2b of the front sidemember 2A in the longitudinal direction of the vehicle. The front sidemember 2B has the branch member 620B that branches off outward in the lateral direction of the vehicle at a middle position of the side surface 2b of the front sidemember 2B in the longitudinal direction of the vehicle. Front ends of the branch members 620A and 620B are respectively connected to end portions of the extension portions 11A and 11B of the bumper reinforcement 603 in the lateral direction of the vehicle. When the end portions 10A and 10B of the bumper reinforcement 603 are deformed, the branch members 620A and 620B of the front sidemembers 2A and 2B function as the support portions 12A and 12B that support the end portions 10A and 10B, respectively.

The strength of at least the front surfaces 9a and 11c, and the extension portions 11A and 11B of the bumper reinforcement 603 is set to be higher than that of other portions of the bumper reinforcement 603. Specifically, in the bumper reinforcement 603, the front high-strength portion 13 is formed by the front surface 9a of the base body portion 9, an edge portion that is formed along the front surface 9a, the front surfaces 11c of the extension portions 11A and 11B, and edge portions that are formed along the front surfaces 11c. The rear high-strength portion 14A is formed by the rear surface 11b of the extension portion 11A and the edge portion that is formed along the rear surface 11b. The rear high-strength portion 14B is formed by the rear surface 11b of the extension portion 11B and the edge portion that is formed along the rear surface 11b. Low-strength portions 617 are respectively formed in the bumper reinforcement 603 in the lateral direction of the vehicle so as to be positioned rearward of the front high-strength portion 13 of the base body portion 9 and the extension portions 11A and 11B. The low-strength portions 617 are respectively formed along a back surface 9b of the base body portion 9 and the back surfaces 11d of the extension portions 11A and 11B. In the embodiment, the bumper reinforcement 603 has low-strength portions 618A and 618B that are respectively formed in portions connected to the front sidemembers 2A and 2B, and has low-strength portions 619A and 619B that are respectively formed in portions connected to the branch members 620A and 620B. Each of the low-strength portions 618A, 618B, 619A, and 619B has a width greater than that of the low-strength portion 617 in the longitudinal direction of the vehicle so as to partially improve impact absorbing performance.

Each of the high-strength portions is formed via a quenching treatment. Each of the low-strength portions is not quenched, or is formed via an annealing treatment. In FIG. 8(a), a dotted portion is the high-strength portion, and a hatched portion is the low-strength portion.

As such, in the structure 600 for the front part of the vehicle body, the support portions 12A and 12B are respectively formed by the branch members 620A and 620B that are provided branching off from the side surfaces 2b of the front sidemembers 2A and 2B. Accordingly, the bumper reinforcement 603 has an improved supporting strength. The branch members 620A and 620B can satisfactorily transmit load to the front sidemembers 2A and 2B. It is possible to improve impact absorbing performance and more effectively move (as illustrated in FIG. 2(b)) the colliding body outward in the lateral direction of the vehicle by partially displacing the bumper reinforcement 603 via the low-strength portions 618A, 618B, 619A, and 619B.

The structure 600 for the front part of the vehicle body has the low-strength portions 619A and 619B that function as the impact absorbing portions, and that are positioned to face the branch members 620A and 620B functioning as the support portions 12A and 12B. Accordingly, when the support portions 12A and 12B support the end portions 10A and 10B of the bumper reinforcement 603 in the lateral direction of the vehicle, respectively, the low-strength portions 619A and 619B can absorb impact, and thus the support portions 12A and 12B can reliably support the end portions 10A and 10B.

Eighth Embodiment

FIG. 8(b) is a plan view illustrating the configuration of a structure 700 for a front part of a vehicle body according to an eighth embodiment. The structure 700 for the front part of the vehicle body is different from that of the seventh embodiment mainly in that the extension portions 11A and 11B of a bumper reinforcement 703 are respectively supported by link members 720A and 720B connected to the front sidemembers 2A and 2B, instead of the branch members 620A and 620B.

The bumper reinforcement 703 has the same configuration as the bumper reinforcement 603 of the seventh embodiment, and has low-strength portions 718A, 718B, 719A, and 719B that have the same configurations as the low-strength portions 618A, 618B, 619A, and 619B of the seventh embodiment, respectively. The bumper reinforcement 703 has the extension portions 11A and 11B extending up to the positions that overlap the wheel 6A and 6B when seen from the longitudinal direction of the vehicle, respectively. The link members 720A and 720B are respectively provided at middle positions of the side surfaces 2b of the front sidemembers 2A and 2B in the longitudinal direction of the vehicle, and branch off outward in the lateral direction of the vehicle. Front end portions of the link members 720A and 720B are respectively connected to the end portions of the extension portions 11A and 11B in the lateral direction of the vehicle so as to face the low-strength portions 719A and 719B. The link members 720A and 720B are respectively joined to the bumper reinforcement 703, and link-joined to the front sidemembers 2A and 2B. When the end portions 10A and 10B of the bumper reinforcement 703 are deformed, the link members 720A and 720B of the front sidemembers 2A and 2B function as the support portions 12A and 12B that support the end portions 10A and 10B, respectively.

The present invention is not limited to the above-mentioned embodiments. For example, the bumper reinforcement is not limited to the configurations illustrated in the above-mentioned embodiments, and appropriate modifications may be made insofar as the modifications do not depart from the scope of the present invention. The size and shape of the area of the high-strength portion or the low-strength portion may be appropriately modified.

INDUSTRIAL APPLICABILITY

The present invention is applicable to the structure for the front part of the vehicle body.

REFERENCE SIGNS LIST 1, 100, 200, 300, 400, 500, 600, 700: structure for front part of vehicle body
2A, 2B: front sidemember
3, 103, 203, 303, 403, 503, 603, 703: bumper reinforcement
6A, 6B: wheel
9a, 11c: front surface
11A, 11B: extension portion
12A, 12B: support portion

The invention claimed is:

1. A structure for a front part of a vehicle body comprising:
a front sidemember that extends in a longitudinal direction of a vehicle;
a bumper reinforcement, at least a part of which is positioned at the same height as the front sidemember in a vertical direction of the vehicle, and extends in a lateral direction of the vehicle so as to face the front sidemember; and
a support portion through which the front sidemember supports an end portion of the bumper reinforcement in the lateral direction of the vehicle when the bumper reinforcement is deformed due to an external force,
wherein the end portion of the bumper reinforcement has an extension portion that extends in the lateral direction of the vehicle up to a position which overlaps a wheel when seen from the longitudinal direction of the vehicle, and wherein at least a front surface of the bumper reinforcement in the longitudinal direction of the vehicle and the extension portion have strength higher than that of other portions of the bumper reinforcement.

2. The structure for the front part of the vehicle body according to claim 1, wherein the support portion is provided integrally with the bumper reinforcement.

3. The structure for the front part of the vehicle body according to claim 2, wherein the support portion has strength higher than that of other portions of the bumper reinforcement.

4. The structure for the front part of the vehicle body according to claim 1, wherein the support portion is a member that is provided branching off from a side portion of the front sidemember.

5. The structure for the front part of the vehicle body according to claim 1, wherein the support portion is formed by a member that is bent outward from the front sidemember in the lateral direction of the vehicle.

6. The structure for the front part of the vehicle body according to claim 1, wherein the bumper reinforcement has a curved shape in which the end portion retreats rearward in the longitudinal direction of the vehicle.

7. The structure for the front part of the vehicle body according to claim 1, wherein the bumper reinforcement has an impact absorbing portion that is positioned so as to face the front sidemember extending in the longitudinal direction of the vehicle.

8. The structure for the front part of the vehicle body according to claim 1, wherein the bumper reinforcement has an impact absorbing portion that is positioned so as to face the support portion.

* * * * *